FIG. I

INVENTORS
ELLIOT BERMAN
HELMUT SCHWAB
BY Louis A Kline
Justin S Lunston
THEIR ATTORNEYS

INVENTORS
ELLIOT BERMAN
HELMUT SCHWAB
BY
THEIR ATTORNEYS 1,3,3-TRIMETHYLINDOLINO-6'-NITROBENZOPYRYLOSPIRAN 1,3,3-TRIMETHYLINDOLINO-6'-METHOXY-8'-NITROBENZOPYRYLOSPIRAN 1,3,3-TRIMETHYLINDOLINO-6'-NITRO-8'-METHOXYBENZOPYRYLOSPIRAN 1,3,3-TRIMETHYLINDOLINO-6'-BROMO-8'-NITROBENZOPYRYLOSPIRAN

INVENTORS
ELLIOT BERMAN
HELMUT SCHWAB
BY Louis A Kline
Justin S Cranston
THEIR ATTORNEYS 10-(9'-2'-METHYLXANTHYLIDENE)-ANTHRONE

3-METHYL-10-(9'-XANTHYLIDENE)-ANTHRONE

3-CHLORO-10-(9'-XANTHYLIDENE)-ANTHRONE 10-(9'-XANTHYLIDENE)-ANTHRONE

INVENTORS
ELLIOT BERMAN
HELMUT SCHWAB
BY Louis A. Kline
Justin S. Leniston
THEIR ATTORNEYS United States Patent Office
3,072,481
Patented Jan. 8, 1963

3,072,481

LIGHT SENSITIVE ELEMENT AND PROCESS FOR RECORDING IMAGES THEREON

Elliot Berman and Helmut Schwab, Dayton, Ohio, assignors to The National Cash Register Company, Dayton, Ohio, a corporation of Maryland

Filed Sept. 17, 1957, Ser. No. 684,592
4 Claims. (Cl. 96—48)

This invention relates to a pressure-fixed photo-chemical printing process, record material, and apparatus, and more particularly pertains to such in which light forms the print on record material directly without the necessity of first forming a latent image thereon and in which the print thereafter is fixed by the application of pressure to the record material.

The process employs record material in the form of a web, such as a sheet of paper or film, having a light-sensitized surface consisting of a pressure-rupturable coating containing droplets of a readily-evaporable liquid vehicle, which vehicle carries a material which changes color when exposed to light of predetermined wave length. Images are formed by projecting light in selected patterns on the coated surface. The print so made is fixed by rupture of the coating by applying pressure, which allows the liquid vehicle to avaporate, leaving the colored and uncolored material in dry solid form. The light-sensitive materials used are easily changed to the colored form while carried in a liquid vehicle but for all practical purposes are insensitive to light while in the solid form.

The coating on the web may consist of a gelled hydrophilic pressure-rupturable colloid film containing microscopic droplets of the vehicle containing the light-sensitive material. Such films containing microscopic liquid droplets are shown in United States Patents Nos. 2,299,693 and 2,299,694, which issued October 20, 1942, on the applications of Barrett K. Green, although the dye materials shown carried by the liquid vehicles were not light-sensitive.

A superior coating to that just mentioned is disclosed in United States Patent No. 2,730,456, which issued January 10, 1956, on the application of Barrett K. Green and Lowell Schleicher. In this last-mentioned patent, the coating on the recording web, which, preferably, is paper, consists of a profusion of microscopic pressure-rupturable capsules, each containing a fluid vehicle carrying a dye or dyes, but such dyes were not light-sensitive.

The coating or film-forming material and the liquid vehicle must be penetrable by the projected light in order to reach the light-sensitive color-forming material. It is within the limits of this invention to rupture the capsules before exposure to light and, while the web is still wet to form the print or image.

The color-forming material preferably is substantially colorless, but it may have an initial intrinsic color, which is changed to another color. Both kinds of color-forming materials are disclosed herein.

It is also within the scope of this invention to have more than one kind of color-forming material in the droplets of liquid vehicle, said different color-forming materials blending in their colored forms, if they differ in color, to give a composite color of their individual colors.

With these and incidental objects in view, the invention will be described with reference to the following specification and to the drawings.

FIGS. 4, 5, 6, and 7 show a related group of indolino-pyrylospiran derivative compounds useful in the process; and FIGS. 8, 9, 10, and 11 show a related group of xanthylidene-anthrone derivative compounds useful in the process.

*General Description*

Figure 1:
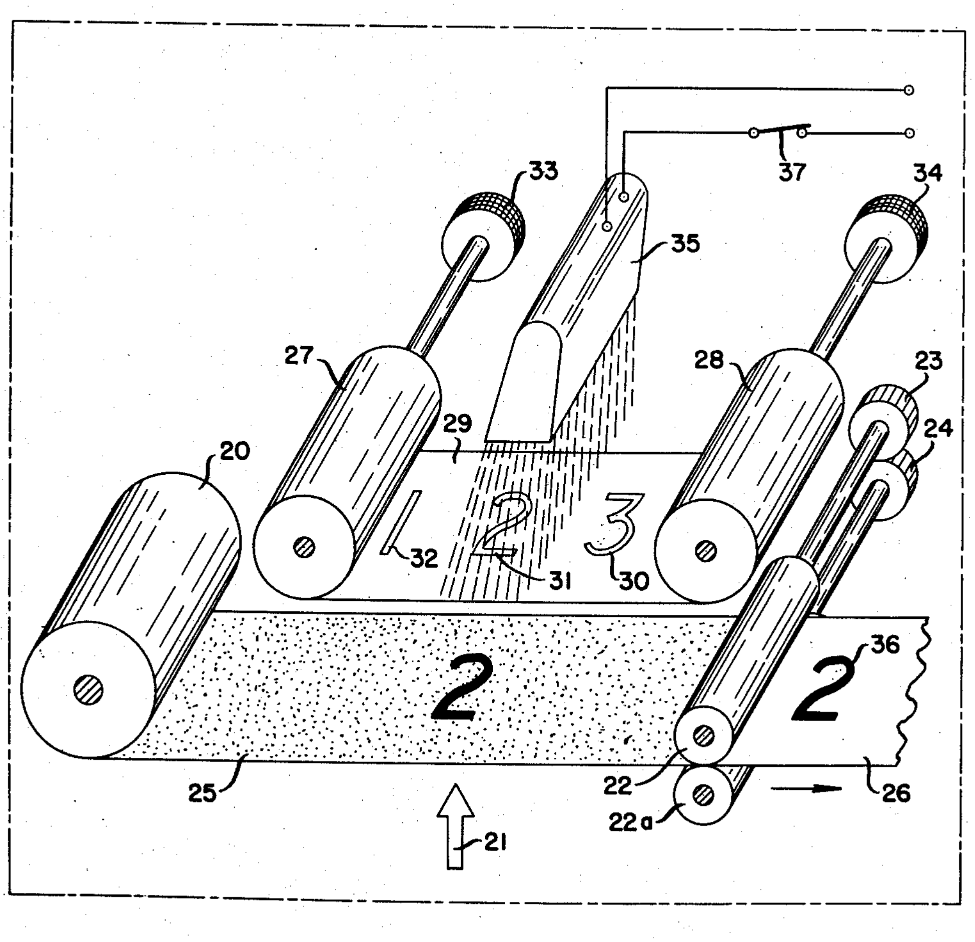
FIG. 1 is a diagrammatic showing of apparatus for moving a light-sensitive web from a supply source past a printing station and through pressure rollers, and also shows means to selectively position a light mask between a light and the light-sensitive web at the printing station.
Figure 2:
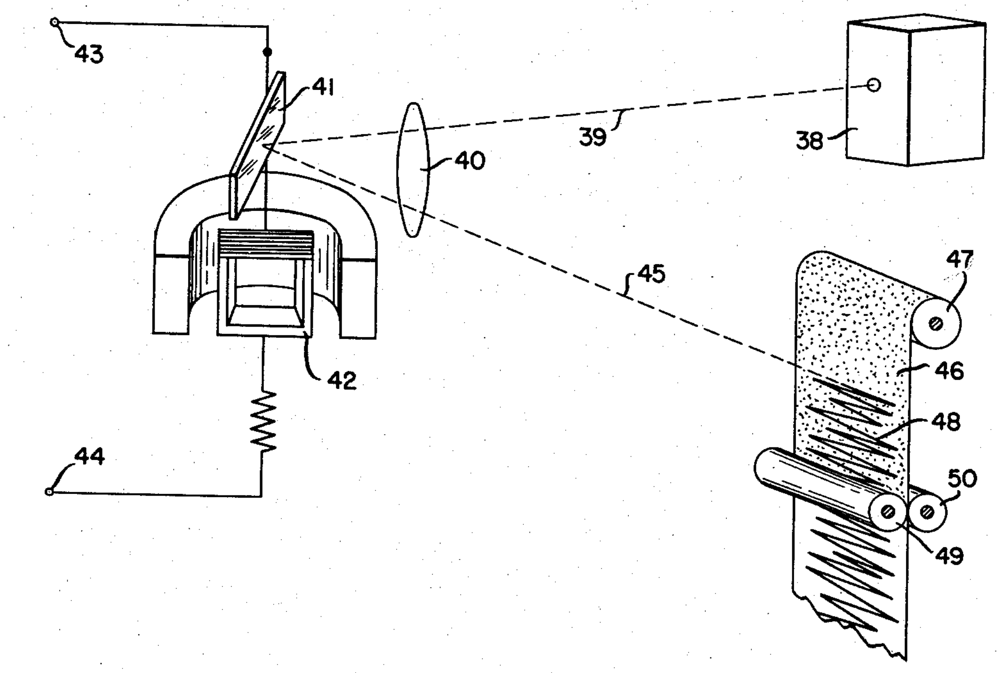
FIG. 2 is a diagrammatic showing of apparatus for tracing on a moving light-sensitive web a beam of light whose movement is controlled by a mirror galvanometer of the D'Arsonval type.

Referring to FIG. 1, which, as has been said, is a diagrammatic showing of one form of apparatus with which the invention can be utilized, there is provided a supply roll 20 of light-sensitive supply paper, which is transportable past a printing station, indicated by the arrow 21, through pressure rollers 22 and **22*a* by the turning of gears 23 and 24 in any desired manner. As shown in this particular diagram, the sensitized surface, before being subjected to the pressure rollers, is indicated by the dotted surface 25, and after being subjected to the pressure rollers, is represented by the surface 26. Positioned over the surface 25 is a scroll consisting of scroll cylinders 27 and 28, on which is wound a strip of light masking material 29, containing light-controlling stencil characters, such as 30, 31, and 32, and other characters which may be on the scroll cylinders out of view. The scrolls may be positioned by knobs 33 and 34 to bring the selected character over the printing station. Of course, any character need not be a continuous form, as shown, but may be a series of numbers or letters, as may be desired. Over the portion of the mask at the printing station is positioned a light source 35, which projects light on that portion of the masking web which is at the printing station, so that those portions of said mask at the printing station which will pass light from light images on the surface 25, to cause that particular portion of the surface 25 to turn to the distinctively-colored form. The web is then passed between the pressure rollers 22 and 22*a* to rupture the coating and allow the evaporable material in the droplets to escape, leaving the characters such as the "2" in its colored, dry, and solid form, as represented by the reference numeral 36. In the dry and solid form, the images so produced will not change color, nor will the material not exposed to light change color, as it, too, is in the solid form, in which solid form it is, for all practical purposes, inert as to color change by applied light. A switch 37 may be provided to control the "off" and "on" condition of the light source 35, to permit the light mask to be positioned at the printing station without any blurring effect. The pressure rollers 22 and 22*a*** may be replaced by any other convenient coating rupturing device which will release the droplets held in the sensitized web.

In another form of apparatus which can be used in connection with the invention, a light source 38 is provided to project a beam of light 39 through an optical system 40 onto the mirror 41 of a D'Arsonval type of galvanometer, the armature 42 of which may be controlled by electrical impulses applied to terminals 43 and 44, to cause the mirror 41 to rotate and shift the reflected beam 45, which beam impinges on the light-sensitized web 46 issuing from a supply roll 47 and movable past a printing station. The light from the mirror causes a trace on said web 46, as indicated by the trace line 48. The trace line and the background of the web are thereafter fixed by being passed through pressure rollers 49 and 50, in a manner similar to that described with reference to FIG. 1. As has been said, any other method of rupturing the sensitized coating can be substituted for the pressure rollers.

Figure 3:
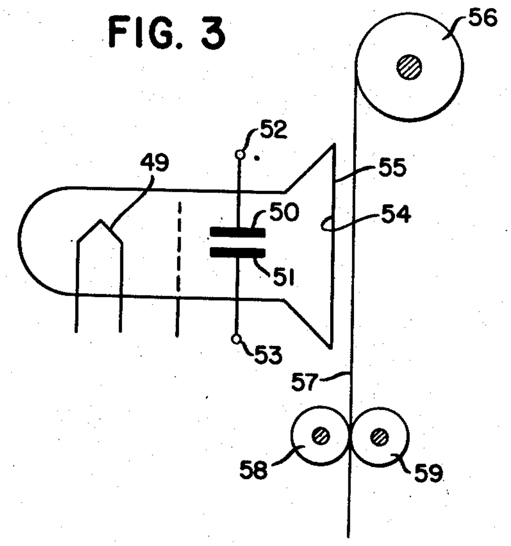
FIG. 3 is a diagrammatic showing of means for projecting light in patterns controlled by a cathode ray tube onto a sensitized sheet movable past the face of the tube and thence through pressure rolls.

With reference to FIG. 3, which shows a cathode ray tube type of apparatus for projecting a controlled beam of light onto the sensitized record material sheet, the electrons issuing from the cathode 49 and controlled by deflection plates 50 and 51, as selected by the energy applied to terminals 52 and 53, impinge upon the inner surface 54 of the cathode screen, which surface is sensitized by a suitable phosphor, to cause an image of light moved in the selected patterns to appear upon the outside surface 55 of the cathode-ray tube. The sensitized web is passed from supply roller 56, past the surface 55 of the cathode ray tube, to receive the image and cause a trace thereof in color on the sensitized surface 57. The web is then transported, and passed through pressure rolls 58 and 59, to fix the print in the manner described before.

The various forms of apparatus which have been described are all concerned with a means for directing an image of light onto a sensitized surface of a web, which web is thereafter passed through pressure devices for rupturing the coated surface, which fixes the print, and all of the structures shown have such in common.

Figure 4:
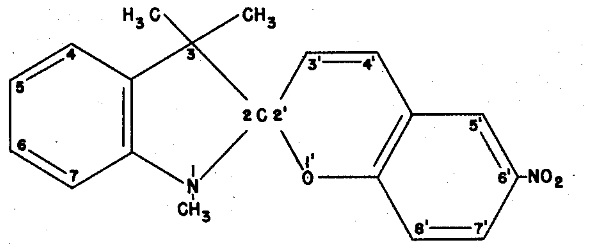
Figure 5:
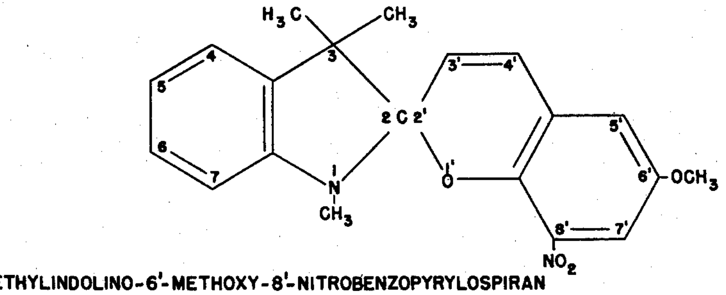
Figure 6:
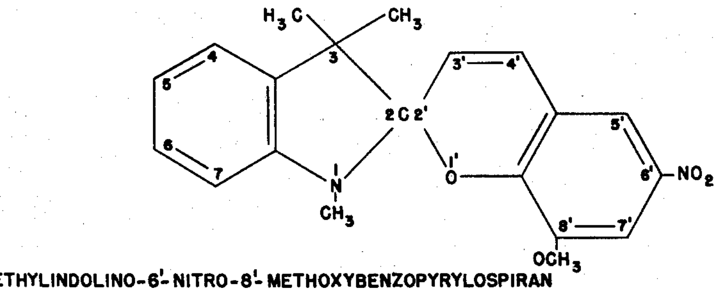
Figure 7:
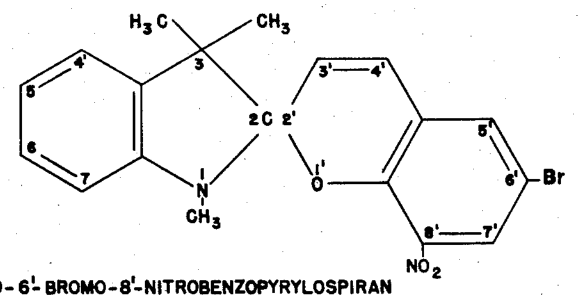
Figure 8:
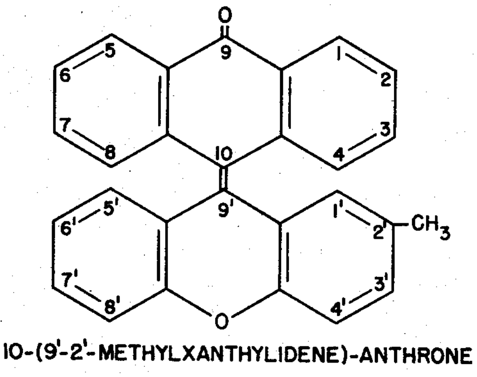
Figure 9:
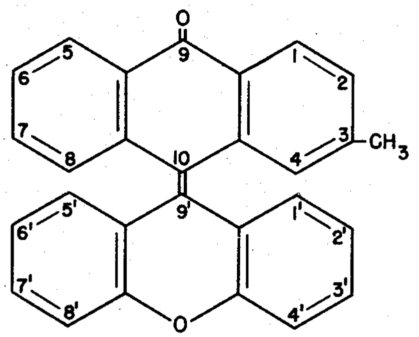
Figure 10:
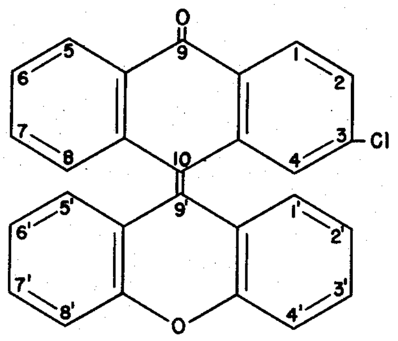
Figure 11:
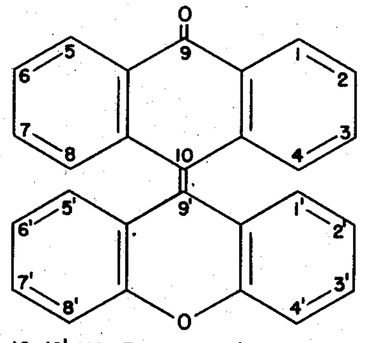

In the preferred form of the invention, the print-receiving web surface is made sensitive to light by being coated with a profusion of volatile liquid-containing microscopic pressure-rupturable capsules, the walls of which capsules are transparent to the exciting wave-lengths of light to be projected thereon. The liquid in each capsule contains the light-sensitive material selected from compounds similar in action to those shown in FIGS. 4 to 11 of the drawings. The shown compounds are exemplary only and are selected because of their quick action to light at room temperature, their resistance to change from the non-colored form to the colored form when subjected to ordinary daylight, and their resistance to change color in the dry solid form from either the colorless or the colored state. About three percent, by weight, of the selected light-sensitive material is dissolved in a substantially non-polar solvent which is readily evaporable at room temperature. Among such solvents may be mentioned diethylbenzene, low-boiling-point petroleum fractions, toluene, and dibutyl ether. As a specific embodiment, three percent, by weight, of the compound of FIG. 4 is dissolved in diethylbenzene, and this solution is encapsulated according to the teachings of United States Patent No. 2,800,457, which issued on July 23, 1957, on the application of Barrett K. Green and Lowell Schleicher. A sample step-by-step process taken from that patent, modified to the use of diethylbenzene, includes the emulsification of 80 grams of the diethylbenzene solution in a solution of 20 grams of gum arabic in 160 grams of water. A solution of 20 grams of pigskin gelatin, having an iso-electric point of pH 8, and 160 grams of water is made and mixed with the emulsion. The pH of the mixture of the emulsion and gelatin solution is adjusted to 4.4. At this point, the gum arabic-gelatin complex which forms has deposited around the internal phase droplets and is still in liquid form, as the ingredients up to this point are kept at a temperature of 50 degrees centigrade. Still at this point, while the ingredients are at 50 degrees centigrade, 3.8 grams of a solution of 37 percent formaldehyde in water is added as a hardening agent, and the temperature is lowered with agitation of the mixture until a temperature of 10 degrees centigrade is reached, to gel the colloid-encased oil solution droplets. After about thirty minutes of agitation at this lowered temperature, the pH is adjusted to 9 with a solution of 20 percent sodium hydroxide in water. The foregoing process produces, by a phenomenon known as coacervation, a profusion of microscopic pressure-rupturable oil-containing capsules suspended in the colloid-poor residual aqueous medium. The suspension may be coated directly onto the web to be printed, and dried. This coating is sensitive to light. The particular light-sensitive compound of FIG. 4 is affected to produce a purple color by light having wave lengths below 4,500 angstrom units. The other compounds in FIGS. 5 to 11 are changed to a distinctive color by light of similar wave length and may be substituted for the compound of FIG. 4. The compounds in FIGS. 5, 6, and 7 turn purple, and those in FIGS. 8 to 11 turn red when exposed to the light of the suggested wave length. For a more detailed discussion of the formation of the capsules by coacervation, reference is made to the aforesaid United States Patent No. 2,800,457. The compounds of FIGS. 8 to 11 in bulk solid form have a slight yellowish color, which is imperceptible in the dilution given for the coated record material. The solutions of the compounds of FIGS. 4 to 7 are colorless.

In a secondary form of sensitive coating on the web to be printed, the diethylbenzene dye solution is emulsified in a hot aqueous solution of gelatin or gum dammar, the emulsion then being coated on the record material web, where it cools and sets, leaving the internal phase entrapped in a pressure-rupturable film as microscopic droplets. This form of a coating, although good when newly made, in time is subject to leakage of the droplets to the surface or to coalescence of adjacent droplets within the film, due to environmental and physical handling conditions. Reference again is made to the United States Patents Nos. 2,299,693 and 2,374,862, for a more thorough discussion of such continuous films.

Due to the fact that the liquid volatile droplets containing the light-sensitive material are microscopic and confined to definite places in the film on the web, and to the fact that a colored image may be made thereon directly, the web itself is novel.

If it is desired to have a capsular or droplet film that is protected against premature coloration by accidental exposure to the predetermined wave length of light, the capsular or film-forming material may be supplied with a light-filtering substance. Of course, in this instance, the capsules would have to be ruptured and then the liquid exposed to light.

What is claimed is:

1. A printing process including the steps of (*a*) providing a recording web having a pressure-rupturable coating containing droplets of a solution consisting of a volatile solvent and a color-forming material having a normally colorless-state but which material when exposed to ultra-violet light while in solution turning to a distinctively colored-state, and said material being fixed against change from the colorless-state to the colored-state by incident ultra-violet light when in solid form so that the colored-state persists in the residual material if the solvent evaporates leaving a solid form thereof, said material being selected from the group consisting of indolino-pyrylospiran compounds and xanthylidene-anthrone compounds, and the said coating being penetrable by ultra-violet light;

(*b*) subjecting the coating to ultra-violet light in data-representing patterns to depict said data-representing patterns on the coated web in said distinctive color; and (*c*) rupturing the coating in desired selected areas to release the solution droplets in those areas, whereby the solvent of the released solution is free to evaporate, leaving the said selected areas fixed against change in state.

2. A printing process including the steps of (*a*) providing a record sheet having a pressure-rupturable coating including pressure-rupturable microscopic walled-capsules each containing an evaporable liquid solvent carrying in solution a color-forming material having a normally colorless-state but which material when exposed to ultra-violet light while in solution turning to a distinctively colored-state, said material being fixed against change from either state to the other when in solid form, said material being selected from the group consisting of indolino-pyrylospiran and xanthylidene-anthrone compounds, and the coating and capsule walls being penetrable by ultra-violet light;

(b) subjecting the coating and included capsules to ultra-violet light in data-representing patterns to depict said data-representing patterns on the coated web in said distinctive color; and (c) rupturing the coating and included capsules in desired selected areas to release the solution, whereby the solvent of the released solution is free to evaporate, leaving the said selected areas fixed against change in state.

3. A recording web having a pressure-rupturable coating containing inclusions of liquid droplets each consisting of volatile solvent in which is dissolved a material selected from the group consisting of indolino-pyrylospiran compounds and xanthylidene-anthrone compounds having a normally colorless state both in solid form and in solution, and a colored state both in solid form and in solution, but which material when exposed to ultra-violet light while colorless in solution is changed from its colorless state to its colored state, said material maintaining its colored state and its colorless state fixed against the action of ultra-violet light when the solvent evaporates, and said coating being penetrable by ultra-violet light, whereby any record made thereon by ultra-violet light is fixed by rupturing the coating, allowing the solvent to evaporate.

4. The recording web of claim 3 in which the liquid droplets of colorable material solution are contained in microscopic pressure-rupturable capsules penetrable by ultra-violet light.

References Cited in the file of this patent

UNITED STATES PATENTS

| | | |
|---|---|---|
| 1,503,595 | Mees | Aug. 5, 1924 |
| 2,082,178 | Ochwat | June 1, 1937 |
| 2,214,365 | Flynn et al. | Sept. 10, 1940 |
| 2,345,549 | Christaldi et al. | Mar. 28, 1944 |
| 2,427,443 | Cochran | Sept. 16, 1947 |
| 2,543,181 | Land | Feb. 27, 1951 |
| 2,582,001 | Bornemann et al. | Jan. 8, 1952 |
| 2,676,887 | Chalkley | Apr. 27, 1954 |
| 2,736,056 | Toulmin | Feb. 28, 1956 |
| 2,800,457 | Green et al. | July 23, 1957 |
| 2,844,465 | Chalkley | July 22, 1958 |
| 2,846,309 | Land | Aug. 5, 1958 |
| 2,864,753 | Chalkley | Dec. 16, 1958 |
| 2,877,167 | Chalkley | Mar. 10, 1959 |
| 2,877,168 | Chalkley | Mar. 10, 1959 |
| 2,877,169 | Chalkley | Mar. 10, 1959 |

FOREIGN PATENTS

| | | |
|---|---|---|
| 200,714 | Australia | Dec. 14, 1955 |
| 814,449 | France | June 23, 1957 |